May 10, 1927.
H. E. SLOAN
CHUCK
Filed July 9, 1923
1,628,476
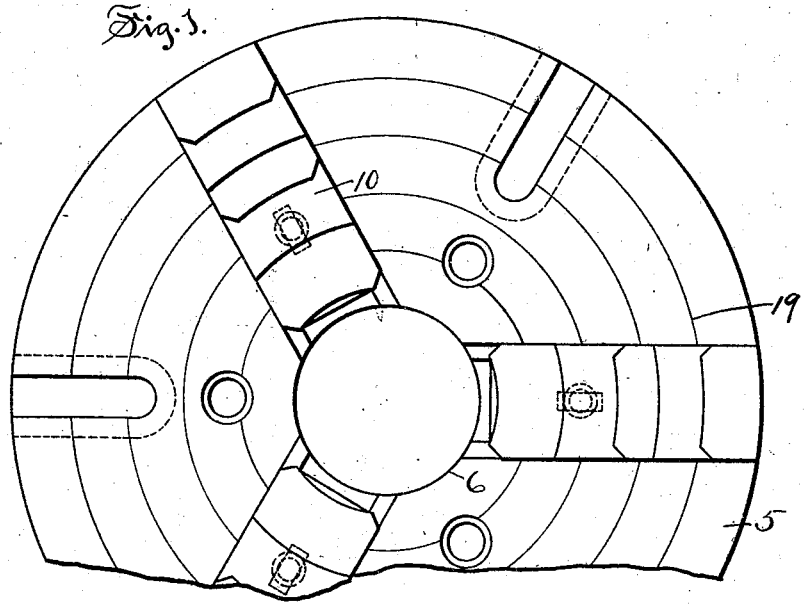
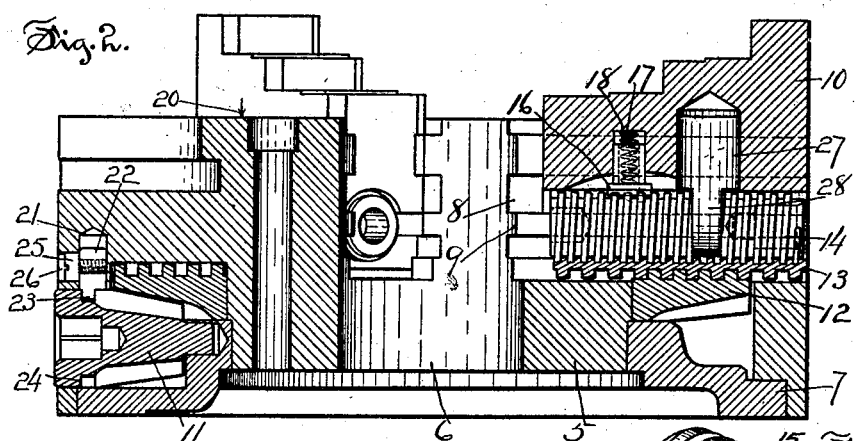
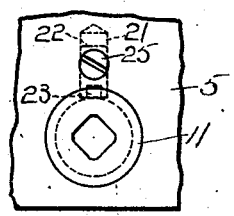
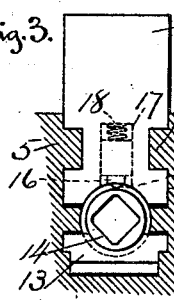
INVENTOR
Harry E. Sloan.
by
Arthur B. Jenkins
ATTORNEY Patented May 10, 1927.

1,628,476

UNITED STATES PATENT OFFICE.

HARRY E. SLOAN, OF HARTFORD, CONNECTICUT.

CHUCK.

Application filed July 9, 1923. Serial No. 650,332.

My invention relates more specifically to that class of chucks embodying a plurality of chuck jaws supported upon a face-plate and movable radially thereon, and an object of my invention, among others, is to provide a chuck of this class in the use of which the jaws, after having been moved from a certain and defined position, may be replaced in the exact position occupied by them before such movement.

One form of chuck of this class embodying my invention and in the construction and use of which the objects herein set out, as well as others, may be attained is illustrated in the accompanying drawings in which—

Figure 1 is a face view of a portion of a chuck embodying my invention.

Figure 2 is a view in central section on a plane passing through the axis of the chuck.

Figure 3 is a view in section through a fragment of the chuck containing a chuck jaw.

Figure 4 is a detail view of a fragment of the chuck looking at the outer surface thereof.

Figure 5 is a perspective view of one of the feed screws illustrating the detent groove therein.

In the use of chucks of the type herein illustrated and described it is often desired to hold pieces of work of irregular shapes, in which the jaws are required to be placed at different distances from the axis of the chuck, this in order to grasp the outer surface of the irregular shaped piece. After the jaws have been moved for the purpose mentioned, or for any other purpose, it is of the utmost importance that they should be replaced so that they will be all concentric with respect to the axis of the chuck, this in order that true pieces of work may be accurately centered. It is for the purpose of effecting such results that I have invented my improved chuck illustrated and described herein, which chuck, as shown in the drawings, comprises a chuck body 5 having a central opening 6, and a back-plate 7, that is secured to the body in any suitable manner. The device thus far described may be of any well known construction common to chucks of this class.

The body is provided with radial grooves 8 (3 in the structure shown) extending from the outer edge of the chuck into the opening 6, and the opposite walls of each of these grooves are provided with ribs 9, fitting grooves in the sides of chuck jaws 10, in a manner common to chucks of this class.

A pinion or pinions 11 is or are mounted in the body of the chuck, each pinion having means, as an opening in its end, for the reception of a tool by means of which it may be turned. These pinions are beveled pinions, their teeth meshing with teeth on the under side of a scroll ring 12 rotatably mounted in the chuck body and having a thread arranged in the form of a scroll to engage the under surface of a jaw carrier 13 mounted appurtenant to each of the chuck jaws, rotation of the scroll by the operation of the pinions 11 operating to simultaneously move the chuck jaws radially upon the chuck body.

In order that the jaws may be independently moved for the purpose of accommodating their positions to grasp the surfaces of pieces of work of irregular shapes and whereby the jaws are required to be located at different distances from the axis of the chuck, feed screws 14 are rotatably mounted in the chuck body, the thread of each screw meshing on one side with a corresponding thread in a jaw carrier 13, and said carrier being operatively connected with the chuck jaw through the interposition of said feed screw.

With the structure thus far described, after the jaws have been moved, as above set out, so that they are located at different distances from the axis of the chuck and for the purposes specified, it is practically impossible to again accurately place the jaws so that they will each be located at the same distance from the axis of the chuck.

In order that the jaws may be so accurately located after they have been moved from concentric positions, I provide a groove 15 in the surface of each feed screw 14, and extending lengthwise thereof, and I also provide a detent 16 that is located in a recess 17 in the under surface of each of the jaws 10, this detent being preferably spring pressed so that it will engage within the groove 15. Preferably this detent is made with a hole extending inwardly from its end in which a spring 18 is located, as shown in Figure 2 of the drawings.

In constructing the chuck the parts will be so arranged that when the detent appurtenant to each jaw is located in its groove 15 in the feed screw 14 the chuck jaws may all be located in concentric positions, that is, they may all be located at the same distance from the axis of the chuck, and means are thus provided for certainly locating the jaws in these positions and with little trouble. As a means for aiding in thus positioning the chuck jaws a series of graduations 19 may be placed upon the face of the chuck as shown by the concentric lines in Figure 1 of the drawings to act in connection with an index point 20 on the side of each chuck jaw as shown in Figure 2 of the drawings, and in this way when each jaw is independently moved by its feed screw 14 so that all of the index points register with the same corresponding graduations on the face of the chuck body, they will all be in the same positions with respect to the axis of the chuck, and by turning the feed screw 14 one way or another until the detent appurtenant thereto snaps into the groove 15 each jaw will be accurately located so that all will be at the same distance from the axis of the chuck.

In order to retain the pinions 11 in place, I provide a pinion retainer recess 21 in the chuck body and opening inwardly from each of the holes in which the pinions are located, and I insert a pinion retainer 22 in each of said recesses, each retainer having a retaining lip 23 to engage a shoulder 24 on a pinion 11, and as shown in Figure 2 of the drawings. A retaining screw 25 is inserted through a hole 26 appurtenant to each pinion, the head of each screw quite closely fitting the hole, but being sufficiently loose to permit its ready rotation, each of said screws being screw-threaded into the pinion retainer to secure such retainer in the position to hold the pinion.

As a means for rotatably retaining the feed screws 14 in place with respect to the chuck jaws I employ a two-part feed screw retainer 27 having straps 28 to encircle a reduced part of each feed screw, said retainer closely fitting recesses in the under side of the chuck jaws and as shown in Figure 2 of the drawings.

In accordance with the provisions of the patent statutes I have described herein the principles of operation of my invention, together with the device which I now consider to represent the best embodiment thereof, but I desire to have it understood that the device shown is only illustrative and that the invention may be carried out by other means and applied to uses other than those above set out.

I claim—

1. A chuck comprising a chuck body, jaws movable radially in said body, a feed scroll mounted in the body, jaw carriers in engagement with said feed scroll, a feed screw for independently moving each of said jaws, each screw having a longitudinally extending notched portion in its periphery, a spring pressed detent carried by each jaw and having a head of a size to be received in the screw notch whereby it may be determined when the several jaws are concentric with the central axis of the chuck body.

2. A chuck comprising a chuck body, jaws movable radially in said body, a feed scroll mounted in the body, jaw carriers in engagement with the feed scroll, a feed screw for independently moving each of said jaws and means carried by the jaws and screws to determine when the jaws are concentric with the central axis of the chuck body, said means comprising a spring pressed element having a tapered head carried by each jaw and a notch in each screw having inclined side walls to receive the element whereby said element is automatically displaced from the screw groove upon rotation of the screw.

HARRY E. SLOAN.